United States Patent
West, Jr. et al.

(10) Patent No.: US 8,127,118 B2
(45) Date of Patent: Feb. 28, 2012

(54) MICROARCHITECTURE, METHOD AND COMPUTER PROGRAM PRODUCT FOR EFFICIENT DATA GATHERING FROM A SET OF TRACE ARRAYS

(75) Inventors: Patrick M. West, Jr., Hyde Park, NY (US); Jane H. Bartik, Poughkeepsie, NY (US); Martin Recktenwald, Steinenbronn (DE); Chung-Lung K. Shum, Wappingers Falls, NY (US); Scott B. Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 12/036,540

(22) Filed: Feb. 25, 2008

(65) Prior Publication Data
US 2009/0217012 A1    Aug. 27, 2009

(51) Int. Cl.
*G06F 9/00*      (2006.01)
*G06F 11/00*     (2006.01)
(52) U.S. Cl. .......................................... 712/227; 714/45
(58) Field of Classification Search ........................ None
See application file for complete search history.

(56) References Cited

U.S. PATENT DOCUMENTS

| | | | |
|---|---|---|---|
| 4,453,093 A | 6/1984 | Boudreau | |
| 6,633,838 B1 | 10/2003 | Arimilli et al. | |
| 7,007,269 B2 | 2/2006 | Sluiman et al. | |
| 7,079,490 B1 | 7/2006 | Hady et al. | |
| 7,284,153 B2 * | 10/2007 | Okbay et al. | 714/30 |
| 7,647,532 B2 * | 1/2010 | Satoh | 714/45 |
| 2002/0052856 A1 | 5/2002 | Satoh | |
| 2003/0018929 A1 | 1/2003 | Bardsley et al. | |
| 2008/0016408 A1 * | 1/2008 | Abernathy et al. | 714/45 |

OTHER PUBLICATIONS

Gregg, et al. "Tracing Hardware for a Multiplexed Interface" TDB. vol. 38. No. 22. Nov. 1995. pp. 419-420.
JP60159949. Publication Date: Aug. 21, 1985. Trace Signal System.
z/Architecture. "Principles of Operation". Sixth Edition (Apr. 2007). IBM. 1218 pages.

* cited by examiner

*Primary Examiner* — Jacob A Petranek
(74) *Attorney, Agent, or Firm* — Cantor Colburn LLP; John Campbell

(57) ABSTRACT

An architecture for collecting performance data in a processor, that includes: a trace read control unit and a trace data collect unit, each unit coupled to a plurality of trace array and multiplex units for providing performance data, the coupling accomplished by a trace read control bus, a data select bus, a trace row address bus and a data return bus; wherein each of the trace array and multiplex units receives a trace read signal and provides data including trace data and the trace read signal to the trace data collect unit. A method and a computer program product are provided.

21 Claims, 5 Drawing Sheets

Fig. 3

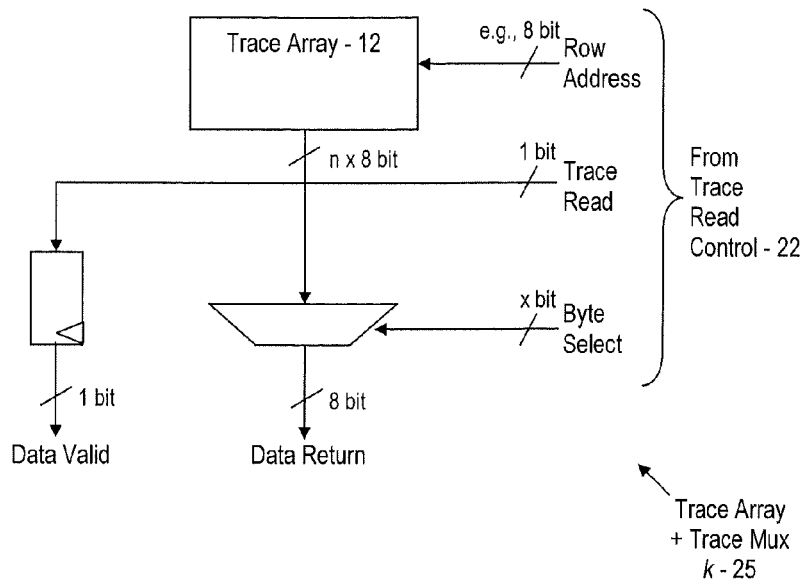

Fig. 4

```
Bit    0    4    8    12   16   20   24   32
------------------------------------------------
       yyyy ehdi aaaa bbbb rrrr rrrr ssss ssss
``` yyyy - Array number of the trace array that should be read
aaaa - Byte offset for the byte within the trace array row where reading should start
bbbb - Byte offset for the byte within the trace array row where reading should stop
rrrrrrrr - Trace array row where reading should start
ssssssss - Trace array row where reading should stop
h - „horizontal" mode bit, see below
d - if this bit is set, only eight bytes will be read (end row address and byte select are effectively ignored), and bit e and i are enabled (otherwise, they are ignored)
e - if this bit is set, the Trace Read indication will be set, otherwise not (only functional if bit d is also set; for normal trace reads, the Trace Read indication will always be set)
i - if this bit is set, eight different bytes will be read (by incrementing row address if h=0, or byte select if h=1); if not,
    the same byte will be read eight times
    (only functional if bit d is also set; for normal trace reads,
    the increment will always happen)

MICROARCHITECTURE, METHOD AND COMPUTER PROGRAM PRODUCT FOR EFFICIENT DATA GATHERING FROM A SET OF TRACE ARRAYS

BACKGROUND OF THE INVENTION

The present disclosure relates generally to microarchitecture, and, in particular, to techniques for efficient data gathering from trace arrays.

A major problem in processor design is keeping usage of hardware resources to a minimum. In a number of designs, trace arrays are used to facilitate performance monitoring. The trace arrays provide data that is used for performance analysis. This data needs to be read out by firmware in regular intervals to prevent the trace arrays from overflowing (overwriting old data with new before the old data has been saved). Thus, the process of reading has to run at a reasonable speed to allow gathering the instrumentation data in a number of cycles that does not disturb the running measurement.

Efficient implementation of trace arrays is complicated by the fact that trace arrays are usually spread around on within the microprocessor, and typically located as near as possible to the source of the captured signals. Current microprocessors can easily contain more than a dozen such arrays. It is prohibitively expensive to connect all of the trace array outputs to the main dataflow of the microprocessor, as this would consume a large amount of wiring resources around traditionally already critical areas.

Some existing solutions multiplex the trace array outputs down to eight (8) bit wide data buses from sixty four (64) bit wide arrays. A trace read control block is then used to control reading the data from the trace arrays in eight (8) bit blocks and delivers this to firmware to store it away to memory, or possibly analyze it before storing it. Delivering the data to firmware is realized by connecting the eight (8) bit wide return data buses from the trace arrays to the trace read control, where it is provided in a register that can be read by firmware. This provides the path into the main dataflow of the microprocessor.

What are needed are techniques for efficient gathering of data from a set of trace arrays in a microprocessor.

BRIEF SUMMARY OF THE INVENTION

Embodiments of the invention include an architecture for collecting performance data in a processor, that includes: a trace read control unit and a trace data collect unit, each unit coupled to a plurality of trace array and multiplex units for providing performance data, the coupling accomplished by a trace read control bus, a data select bus, a trace row address bus and a data return bus; wherein each of the trace array and multiplex units receives a trace read signal and provides data including trace data and the trace read signal to the trace data collect unit.

Other embodiments include a method for collecting performance data in a processor, that includes: sending a trace read signal including an address to selected ones of a plurality of trace array and multiplex units; for each of the selected ones, identifying the address of the trace read signal and reading the performance data stored at the address; forwarding the trace read signal with the performance data to a trace data collect unit; and one of incrementing and decrementing the address and repeating the sending, identifying, performing and forwarding until the performance data is collected.

Further, disclosed herein is a computer program product including machine executable instructions stored on machine readable media, the product including instructions for collecting performance data in a processor, by: sending a trace read signal including an address to selected ones of a plurality of trace array and multiplex units; for each of the selected ones, identifying the address of the trace read signal and reading the performance data stored at the address; forwarding the trace read signal with the performance data to a trace data collect unit; and one of incrementing and decrementing the address and repeating the sending, identifying, performing and forwarding until the performance data is collected.

BRIEF DESCRIPTION OF THE DRAWINGS

Referring now to the drawings wherein like elements are numbered alike in the several figures, wherein:

FIG. 3 provides further detail regarding the trace array presented in FIG. 2;

FIG. 4 depicts aspects of an embodiment of a trace read control register layout;

DETAILED DESCRIPTION OF THE INVENTION

Figure 1:
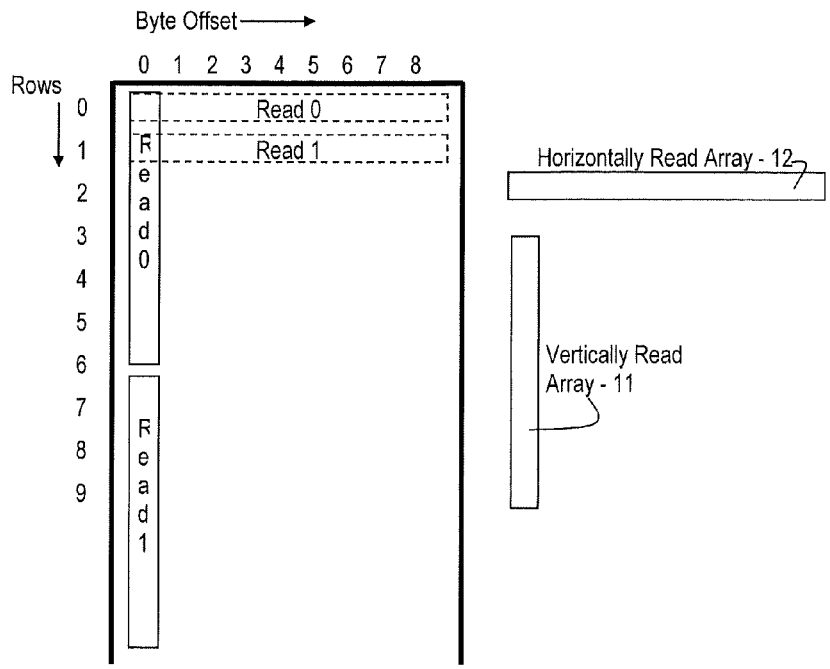
FIG. 1 illustrates horizontal and vertical arrangement of trace arrays.

The teachings herein provide for efficient gathering of performance data from a set of trace arrays in a microprocessor. Techniques for instrumentation sampling in a microprocessor are known, and provide a basis for the teachings herein. One example includes U.S. Pat. No. 4,590,550, entitled "Internally Distributed Monitoring System," which issued May 20, 1986, and is incorporated herein by reference in its entirety. This patent provides an embedded hardware/software monitor for a data processing system. The monitor embeds and distributes a plurality of instrumentation table units (ITUs) within various hardware entities in the system to collect sampled hardware signals local in the hardware entity in which the respective ITU is embedded, (e.g. in each CPU, I/O processor, system controller, main storage controller, etc.). Instrumentation measurement is controlled centrally in the system. Sampling of the system signals is done periodically at a low-rate relative to the CPU machine cycle rate, and the sampled signal are collected in the ITUs for instrumentation analysis. Sampling pulses are synchronously provided in all ITUs in the system. The ITU collected hardware signals are related to software controlled trace entries made in a trace table (TT) in main storage by each CPU in the system executing tracing and other predetermined instructions. An asynchronous relationship between the TT entries and the ITU entries is bridged by the intervening table, called SAT, located in storage. The SAT entries receive time-of-day (TOD) values also found in associated TT entries to relate them.

Another example includes U.S. Pat. No. 4,821,178, entitled "Internal Performance Monitoring by Event Sampling," which issued Apr. 11, 1989, and is incorporated herein by reference in its entirety. This patent provides event-controlled operations for an internal hardware/software monitor for a processor in a data processing system. The monitor embeds and distributes in each processor at least one instrumentation table unit (ITU) and event detection circuitry to detect events and conditions for collecting event-sampled hardware signals provided in the processor hardware in which the respective ITU is embedded. Instrumentation measurement is controlled centrally in the system. Sampling of the CPU signals for recording in the ITU is done at (or a sub-multiple of) the occurrence rate of the selected event(s) in the processor. The sampled signals are recorded in the ITU. The ITUs of plural processors are asynchronously operated in a system. The event-driven monitoring circuitry may be solely provided in an ITU, or it may be superimposed on a timer-driven internal instrumentation system of the type described in U.S. Pat. No. 4,590,550 in which the ITU is shared between event and timer driven modes of operation. Branch-taken event monitoring is also included.

The solution presented herein is based on the designs presented in the '550 patent and the '178 patent. Advantageously, the solution is well suited for very high frequency microprocessors. It improves significantly on existing designs that fetch the next eight (8) bit block or possibly combine several eight (8) bit blocks on firmware request.

One skilled in the art will recognize that the teachings herein are generally disclosed in terms of an eight (8) bit wide data path, or of data that is sixty-four (64) bits wide. However, one skilled in the art will recognize that bit size and other such factors discussed herein are merely illustrative and are not limiting of the invention.

With regard to prior art schemes, a major problem is the long startup time of the trace read control due to pipeline delays. Also, such schemes imply noticeable overhead for firmware to keep asking for a specific block of data. Furthermore, in traditional schemes, the trace read control and the logic that collects the data that is read from the trace arrays have to be physically in the same space to allow the trace collection logic to be notified of when data will arrive from the trace arrays. This is an additional burden in both wire resources and area. The solution presented here requires just a minimal set of connections between trace read control and the trace collect logic, thereby permitting physical separation of trace read control and trace collect logic from each other. Additionally, different latencies from different arrays can be handled. For example, arrays that are physically next to trace read data collect logic can be connected with less distance in terms of pipeline cycles than arrays that are physically far away. The trace collect logic requires no knowledge of these latencies.

Among other things, the present invention provides for pre-fetching data from the trace arrays. For example, a control register may be provided for firmware to describe which data (which rows/columns) is to be read from the arrays. Trace read control logic then starts fetching several data blocks in advance, even before an actual trace read was received from firmware. Generally, each data block is sixty four (64) bits wide, and up to three (3) data blocks can be pre-fetched. After initially setting up the control register, firmware issues the number of trace read commands that are necessary to get the amount of data asked for in the initial setup. No further firmware interaction with the trace read control is required.

To allow separation of the trace read control from the trace collect logic, the trace read control sends an additional trace read indication to the arrays. This indication is returned to the trace collection block and drives the logic that collects the data. The collected data is then available in a firmware-accessible register. The Trace Read indication also facilitates handling of different latencies from the trace arrays to the trace data collect logic, without requiring knowledge of the latencies in the trace data collect logic.

In some embodiments, the trace collect logic is built as a two-level multiplexer hierarchy with byte shifting capability. This special design causes significantly less logic delay than in the prior art and simplifies wiring when compared to simple implementations. This design may also include a three-level buffer hierarchy to store the data that was pre-fetched by the trace read control.

As a feature directed to low-frequency performance sampling events, the trace read control supports two different modes of reading the trace arrays. For example, existing implementations read the trace arrays vertically in sixty four (64) bit chunks. They return one (1) byte of data from eight (8) consecutive array rows. This is an efficient scheme if the arrays are usually filled up completely, and not all bytes of a row are needed. However, new firmware controlled sampling schemes often sample just one single entry before doing a logout, and that entry often spans full eight (8) bytes. The trace read control logic includes an optional horizontal read mode, where eight (8) bytes from one (1) row are returned in one chunk of data, sixty four (64) bits wide. The logic is capable of handling reads that start at any arbitrary byte offset within a trace array row, and could easily be expanded to even allow arbitrary bit offsets. Application of this logic is depicted diagrammatically in FIG. 1, which includes a horizontally read array 12 and a vertically read array 11. More specifically, FIG. 1 depicts patterns for reading of trace arrays. Note that allowing selectable offsets is useful in cases where the data is, for example, physically available to the right of the array, and wiring resources are limited. In this example, crossing the array width is not necessary.

Figure 2:
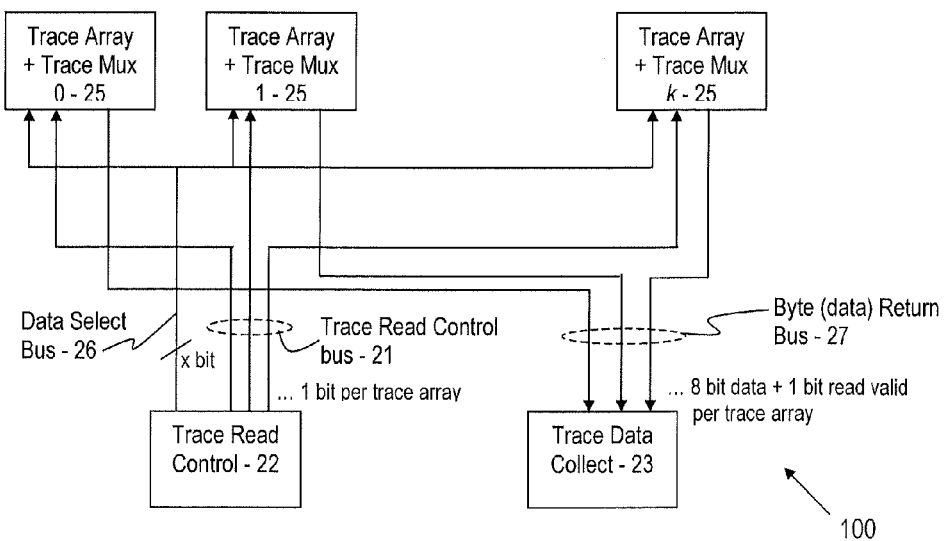
FIG. 2 provides an overview of components for trace read control.

Now referring to FIG. 2, there is shown a high level view of an architecture 100 for gathering of trace array data. In this example, the architecture 100 includes a trace read control bus 21, a separate trace read control 22 and logic for a trace data collect 23. In some embodiments, the trace read control 22 and the trace data collect 23 are coupled to a plurality of trace array and trace multiplex units, shown as blocks 25. The blocks 25 are generally referenced as block 0 to block k. For the example presented herein, k=15. In general, the trace array and trace multiplex units provide performance data to other components of the architecture 100.

In general, each of the trace array and trace multiplex units (shown as "trace array+trace mux") blocks 25 receives signals from the trace read control 22 via the trace read control bus 21 and also from a byte (or data) select bus 26, shown as being x bit(s) wide. In various embodiments, there is just one byte select bus 26 that connects to all trace array+trace mux blocks 25. The byte select bus 26 is used to select one (1) byte from the several bytes wide trace arrays on a trace array read. In one embodiment, the arrays are nine (9) or twelve (12) bytes wide in the actual implementation, so the width of the byte select bus 26 is four (4), or x=4.

Signals may also be received from a trace row address bus (not shown). The trace row address bus is used to select which trace array row 12 is being read. For example, the trace row address bus could be eight (8) bits wide for 256 row deep arrays. As with the byte select bus 26, there is just one trace row address bus that connects to all trace array+trace mux blocks 25.

Further, a trace read signal may be received. Generally, the trace read signal is a single bit signal. Each of the Trace Array+Trace Mux blocks 25 is connected to a separate trace read signal. The trace read signal indicates which trace array 11, 12 is being read, and identifies the cycles where a data return bus 27 delivers valid data from the arrays 11, 12.

Each of the Trace Array+Trace Mux blocks 25 sends data via the data return bus 27 to the trace data collect logic 23. In this embodiment, the data return bus 27 is nine (9) bits wide.

One of the bits is used to return the trace read signal as sent from the trace read control 22 back to the trace data collect logic 23. This leaves eight (8) bits for return of actual trace data per clock cycle.

In some embodiments, the teachings herein provide for having write controls together with the trace read control 22, and using the Trace Row Address bus also for trace writing. A separate write enable may then be used to toggle between reading and writing.

Although the drawing does not show any staging latches for the sake of simplicity, at very high clock frequencies, several staging latches may be needed to account for the physical distance between the trace read control 22, the trace data collect logic 23 and the trace array+trace mux blocks 25. This means that latency between any action that takes place in the trace read control 22 and when results are available in the trace data collect 23 will be several, up to and potentially more than ten clock cycles. A programming interface to allow controlling the trace read control 22 through firmware will be described further below.

The trace data collect logic 23 collects multiple bytes from one trace array into one register. For example, the trace data collect logic 23 includes a read interface that transfers the trace data through the main processor dataflow to a register that can be accessed by firmware. In this embodiment, trace data is always read and returned in chunks that are eight (8) bytes wide.

In FIG. 3, an exemplary view of aspects of the trace Array+ Trace Mux block 25 is provided. In this example, the trace array 12 receives a row address from the trace read control 22 and determines which array row is to be read. The trace read bit is forwarded to the trace data collect logic 23. The byte select bus 27 is used to select one byte from the multiple byte wide trace array output. This byte is then also returned to the trace data collect 23.

With regard to an interface to firmware, the trace read control 22 includes a trace read control register that can be directly written by the firmware. In this register, firmware specifies which array to read, where to start the read (which row address and byte offset), and where to stop the read (again, row address and byte offset). Upon initiation of a write to this register, the trace read control logic starts getting data from the trace array. Following this write, the firmware generally performs an appropriate number of reads from the trace data collect logic 23. For example, if the firmware asked for a total of N sixty-four (64) bit words of trace data, it has to perform N reads. One example of a layout for the trace read control register is provided in FIG. 4.

Figure 5:
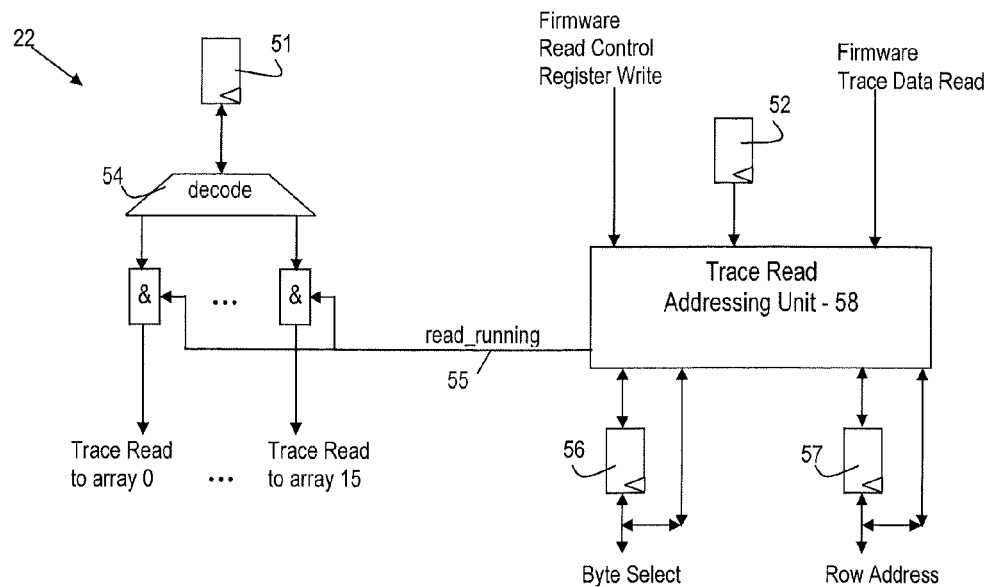
FIG. 5 provides an overview of aspects trace read control.

FIG. 5 provides an overview of aspects of the trace read control 22. When firmware writes the read control register, the firmware read control register write input will pulse. An array select register 51 is then set to a value specified in bits 0:3 in the write, another register 52 stores remaining bits of the write. The outputs of a trace readaddressing unit 58 are the trace read indications and the current contents of the byte select register 56 and the row address register 57. The trace read indications are generated by decoding the value of an array select register 51 with a decoder 54 and gating the result with a read running signal 55 from the trace read control 22.

The trace read control 22 increments the row address and byte selects until the last row address/byte offset as specified in the firmware write to the trace read control register is reached. The buffer space in the trace data collect 23 is limited, so a data overrun could occur if data is read out of the arrays 11, 12 by the trace read control 22 faster than firmware can read it from the trace data collect 23. Therefore, the trace read control 22 implements a simple stalling mechanism, such as a stall counter that is incremented for each newly started eight (8) byte read, and decremented for each firmware trace data read. If the stall counter reaches the amount of available buffer space, the trace read control 22 will stop reading until a buffer is freed up again (for example, by the next firmware trace data read). In general, the read_running signal 55 is active while a trace read is in progress and not stalled.

Incrementing of row address and byte select is done differently depending on the setting of the horizontal mode bit. As an example, if the horizontal mode bit is cleared, the row address is incremented first, and when it wraps around, byte select is incremented. If the horizontal mode bit is set, byte select is incremented eight (8) times, then the row address is incremented and the byte select is reset to the byte start offset (as shown in FIG. 4). This means that in horizontal mode, eight (8) bytes are always read from one (1) row. This option is directed towards reading just a few, possibly only one, line of instrumentation data from the trace arrays. Generally, the read sequence is repeated for each array that should be read.

Figure 6:
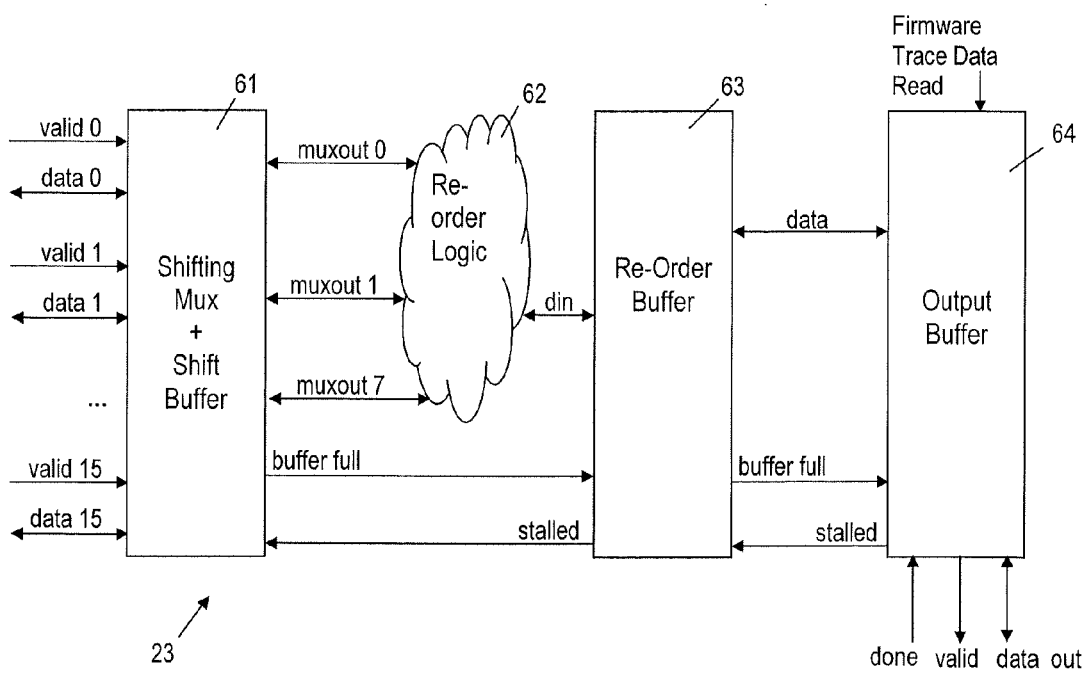
FIG. 6 depicts aspects of building blocks for trace data collect logic.

With regard to the trace data collect logic 23, FIG. 6 depicts certain components thereof. In this example, data from sixteen (16) trace arrays is received by a shifting multiplexer (mux)+shift buffer 61 through the data0 to data15 inputs. The trace read indications are referred to as valid0 to valid15. Eight (8) bytes of data are received on consecutive clock cycles and then sent through eight (8) one-byte buses muxout0 to muxout7 through the reorder logic 62 to the reorder buffer 63. The reorder buffer 63 sends the data to the output buffer 64. Flow control is implemented by buffer_full and stalled indications. For example, a buffer signals "buffer_full" to the next buffer in line if it already has data. It sends "stalled" to the previous buffer in line if its buffer is full and the next buffer also sends a stalled signal. If a buffer is not stalled, and the previous buffer signals buffer_full, data will be shifted forward, towards the output buffer 64. It should be recognized that not all of the components provided in the trace data collect logic 23 are required. For example, in some embodiments, the reorder logic 62 or the reorder buffer 63 is not included in the trace data collect logic 23.

Both the reorder buffer 63 and the output buffer are sixty-four (64) bit registers. The output buffer 64 receives the same firmware trace data read indication as the trace read control 22. If it is received and data is available, it will be copied to a firmware accessible register. The output buffer 64 includes data_out and valid outputs, as well as a done input, and implements a simple handshaking protocol to deliver the data.

Figure 7:
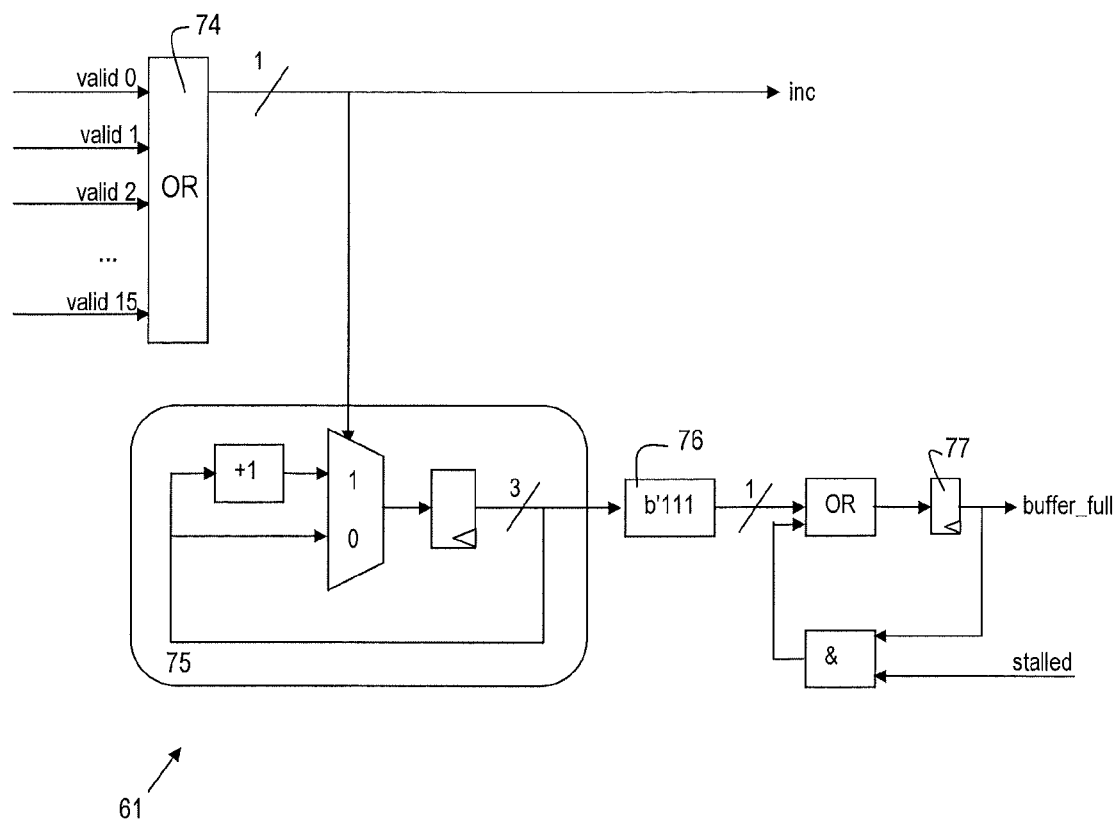
FIGS. 7 and 8 depict aspects of logic included in the shifting multiplexer and shift buffer.
Figure 8:
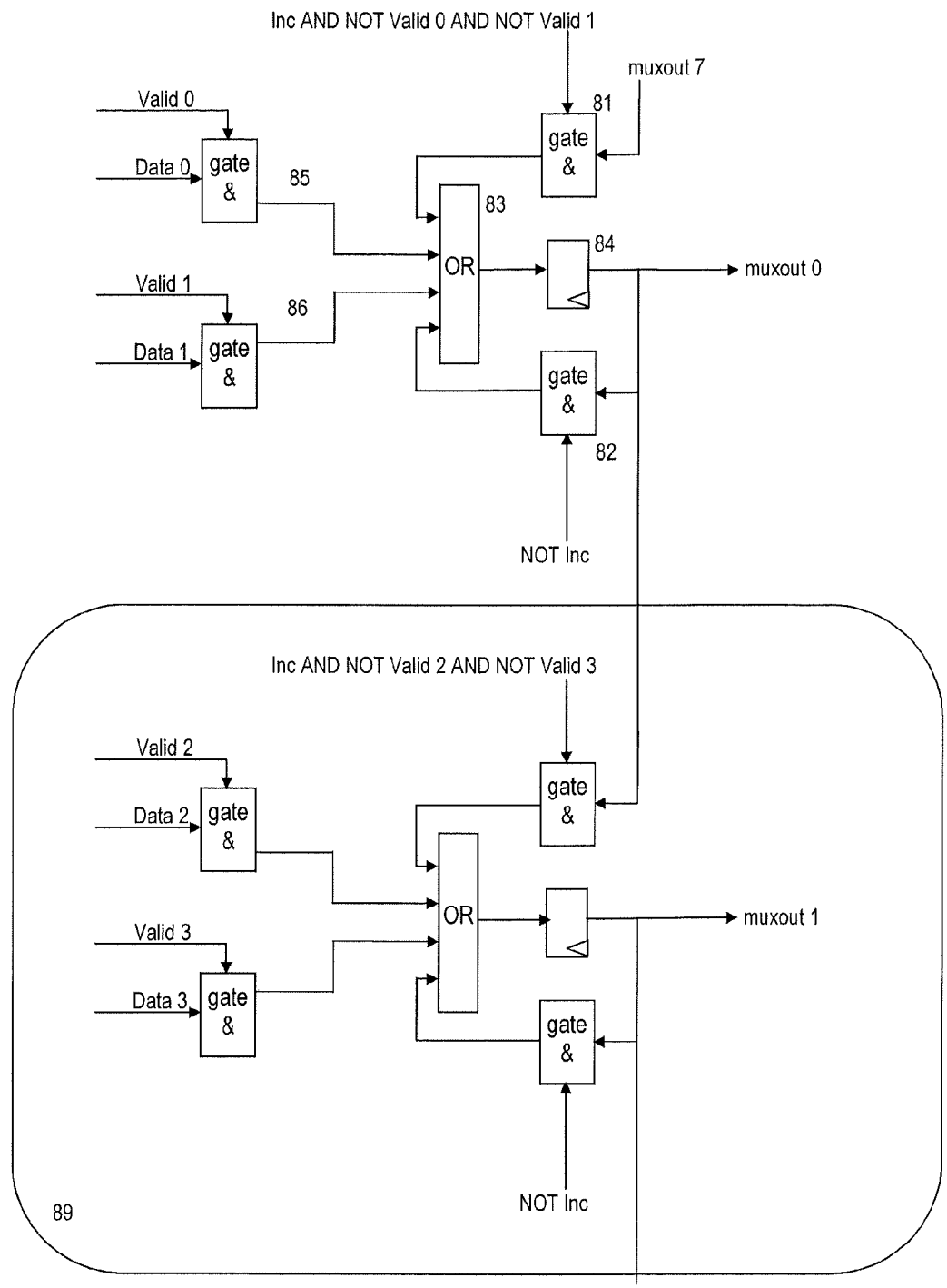

The shifting mux+shift buffer 61 includes special trace data receiving logic that is shown in detail in FIGS. 7 and 8. Note that the abbreviation "mux" makes reference to a multiplexer, as is commonly used in the art.

FIG. 7 depicts aspects of control logic for the shifting mux and shift buffer 61. In this example, all valid indications are ORed together 74 to form an "inc" signal. The inc is active if data is received from any trace array 11, 12. By design of the trace read control 22, at most one valid indication can be active in any cycle. Besides the other usages shown in FIG. 8, inc is used to increment a three-bit incrementer 75. A comparator 76 generates a signal when the incrementer 75 reaches the binary value 111. The output of the comparator 76 is used to set a flipflop 77. The output of the flipflop 77 is used as indication that the trace buffer has valid data (i.e. all eight (8) bytes hold data from a trace array). This indication is sent to the reorder buffer 63 as a buffer_full signal, and used to hold the flipflop 77 in set state if the reorder buffer 63 has the stalled signal active. This means that as long as the reorder buffer 63 signals a stalled condition, the shift buffer 61 stays in the buffer_full state.

The shifting mux portion is implemented by eight (8) repetitions of the logic blocks (reference items 77, 81-86). Item 83 includes the one byte wide flipflops 77 that hold the trace data. With eight (8) repetitions, the total size of the shift buffer is sixty-four (64) bits.

The shift buffer flipflops 83 are loaded by either data0 (if valid0 is set, gating is implemented by the flipflop 77), data1 (if valid1 is set, gating is implemented by a first gate 85), holding its current value (if none of the valids are currently set, i.e. inc is 0, gating is implemented by another gate 81) or loading the value from the previous shift buffer flipflops (in which case, gating is implemented by yet another gate 86). As this represents the first of eight (8) repetitions, the previous shift buffer flipflops are those from the last shift buffer, so this configuration acts as a byte-wide rotator. For illustrative purposes, gate 82 shows input of data from inputs data2 and data3. It should be noted that as presented in FIG. 7 and elsewhere herein, that with reference to gates or gating, the symbology "&" which symbolizes gate-AND, where gate-AND is a function where a single bit input signal gates a whole bus using ANDs.

In summary, the shifting mux+shift buffer 61 collects data by storing eight (8) successive bytes from one trace array in the shift buffer flipflops, and shifting this byte every cycle through the mux latches itself. Thus, no data will be overwritten until the ninth byte is received. The buffer_full indication is sent to the next buffer stage in exactly the cycle where the buffer is full. With the stall counter in the trace read control, it is made sure that the ninth byte will only be received if the shift buffer contents can be forwarded to the reorder buffer. The trace read control will not start more trace reads if there is not enough buffer space available in the trace data collect block.

Although described herein in terms of "logic" and as a "unit," such terms are merely for convenience, and are not limiting of the teachings herein. For example, certain components described herein may be implemented by various circuitry, shared circuitry, computer program products stored on machine readable media, and in other such embodiments. Further, it should be recognized that certain functionality, such as that described herein, may be shared or performed by components other than as disclosed in the non-limiting embodiments provided.

Technical effects and benefits include the provision of an architecture, methods and apparatus for efficient gathering of data from a set of trace arrays in a processor.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for collecting performance data in a processor, the system comprising:
    a plurality of trace arrays and trace muxes;
    a trace read control unit in communication with the plurality of trace arrays and trace muxes via a read control bus; and
    a trace collect unit, the system configured to perform a method comprising:
    sending trace read bits and an address to the plurality of trace arrays and trace muxes, the sending from the trace read control unit and each trace read bit associated with one of the plurality of trace arrays and trace muxes;
    receiving a trace read bit and the address at each of the trace arrays and trace muxes;
    forwarding, at each of the trace arrays and trace muxes, trace data stored at the address and the received trace read bit to the trace collect unit that is in indirect communication with the trace read control unit;
    reading, at the trace collect unit, the trace data received from a trace array and trace muxes, the reading responsive to contents of the trace read bit associated with the trace array and trace muxes; and
    one of incrementing and decrementing the address and repeating the sending, receiving, forwarding, and reading until the trace data is collected.

2. The system of claim 1, wherein the trace data comprises the performance data.

3. The system of claim 1, wherein the trace read control unit comprises: at least one read control register; an array select register; a register for storing remaining bits of a write; and, outputs comprising at least one of trace read indications, current contents of a byte select register and a row address register.

4. The system of claim 1, wherein the trace read control unit comprises at least one of a stalling mechanism for implementing flow control and a counter for at least one of decrementing and incrementing the address.

5. The system of claim 1, wherein the trace data collect unit comprises at least one of: a shifting multiplexer and shift buffer; re-order logic; a re-order buffer; and an output buffer.

6. The system of claim 5, wherein the shifting multiplexer and shift buffer receive output from the plurality of trace arrays and trace muxes.

7. The system of claim 1, wherein the trace data collect unit implements flow control comprising at least one of a buffer signal and a stalled signal.

8. The system of claim 1, wherein the trace read control comprises a counter for at least one of incrementing and decrementing the address.

9. The system of claim 1, wherein the trace data collect unit further comprises at least one of a comparator and a incrementer.

10. A method for collecting performance data in a processor, the method comprising:
sending trace read bits and an address to a plurality of trace arrays and trace muxes, the sending from a trace read control unit and each trace read bit associated with one of the plurality of trace arrays and trace muxes;
receiving a trace read bit and the address at each of the trace arrays and trace muxes;
forwarding, at each of the trace arrays and trace muxes, performance data stored at the address and the received trace read bit to a trace data collect unit that is in indirect communication with the trace read control unit;
reading, at the trace data collect unit, the performance data received from a trace array and trace muxes, the reading responsive to contents of the trace read bit associated with the trace array and trace muxes; and
one of incrementing and decrementing the address and repeating the sending, receiving, forwarding, and reading until the performance data is collected.

11. The method as in claim 10, further comprising: implementing flow control for prevention of overwriting of performance data.

12. The method as in claim 11, wherein implementing flow control comprises at least one of sending a buffer full signal and a stalled signal.

13. The method as in claim 10, wherein the trace data collect unit collects the performance data into a firmware accessible register.

14. The method as in claim 10, wherein the reading is performed in one of a horizontal read mode and a vertical read mode.

15. The method as in claim 10, wherein the sending comprises multiplexing a plurality of trace read signals over a trace read control bus.

16. A computer program product for collecting performance data, the computer program product comprising:
a non-transitory storage medium readable by a processing circuit and storing instructions for performing a method comprising:
sending trace read bits and an address to a plurality of trace arrays and trace muxes, the sending from a trace read control unit and each trace read bit associated with one of the plurality of trace arrays and trace muxes;
receiving a trace read bit and the address at each of the trace arrays and trace muxes;
forwarding, at each of the trace arrays and trace muxes, performance data stored at the address and the received trace read bit to a trace data collect unit that is in indirect communication with the trace read control unit;
reading, at the trace data collect unit, the performance data received from a trace array, the reading responsive to contents of the trace read bit associated with the trace array; and
one of incrementing and decrementing the address and repeating the sending, receiving, forwarding, and reading until the performance data is collected.

17. The method of claim 16, further comprising: implementing flow control for prevention of overwriting of performance data.

18. The method as in claim 17, wherein implementing flow control comprises at least one of sending a buffer full signal and a stalled signal.

19. The method as in claim 16, wherein the trace data collect unit collects the performance data into a firmware accessible register.

20. The method as in claim 16, wherein the reading is performed in one of a horizontal read mode and a vertical read mode.

21. The method as in claim 16, wherein the sending comprises multiplexing a plurality of trace read signals over a trace read control bus.

* * * * *